3,112,281
POLYURETHANE FOAMS AND PROCESS FOR PREPARING SAME

Richard E. Gromacki, Trenton, and Kurt C. Frisch, Grosse Ile, Mich., assignors to Wyandotte Chemicals Corporation, Wyandotte, Mich., a corporation of Michigan
No Drawing. Filed Sept. 17, 1957, Ser. No. 684,436
10 Claims. (Cl. 260—2.5)

This invention relates to polyurethane foams and to ways and means for obtaining the same. More particularly, it relates to polyurethane foams derived from polyoxypropylene derivatives of ethylene diamine and to ways and means for obtaining such foams wherein said polyoxypropylene derivatives of ethylene diamine are one of the major reactants.

Polyurethane compositions are usually regarded as the reaction product of a polyisocyanate and an active hydrogen-containing, organic compound such as a hydroxy terminated polyester, polyester amide, or a dihydric polyether. By providing an excess of polyisocyanate in the reaction mixture and by adding water during the chain extension and cross-linking phases of the reaction, the polyurethane product can be obtained as a foamed article useful as insulation, comfort cushioning and the like.

In general, the art has developed various methods of manufacturing articles of polyurethane foam.

In the "prepolymer" method of manufacturing foamed articles, the polyisocyanate, in stoichiometric excess, is first reacted with an active hydrogen-containing, high molecular weight, organic compound whereby a "prepolymer" is formed. The "prepolymer" and water are then mixed together whereupon the "prepolymer" polymerizes and cross-links while excess polyisocyanate and water react to produce carbon dioxide gas which functions as the blowing agent.

In the "one-shot" method of manufacture, usually used in making foamed-in-place articles, the reactants are mixed together all at once and the resultant mixture immediately injected or poured into a mold or form. In one variation of this method, the "premix" method, an active hydrogen-containing, high molecular weight, organic compound, the water, and other materials are first mixed together and then mixed with the appropriate amount of polyisocyanate.

Regardless of the method of manufacture used, it is necessary in manufacturing foamed articles that the polymerization and $CO_2$ release come to a stop at approximately the same time. If the foam "sets" before all the $CO_2$ has been released, the foam may scorch due to excessive heat build-up and the higher density of the reaction product. On the other hand, if the release of $CO_2$ is completed before the foam "sets," the foam may shrink or even collapse. Usually, it is the latter case that prevails: i.e., the rate of polymerization and cross-linking is slower than the rate of reaction of excess polyisocyanate with water and thus the rate of $CO_2$ release.

Consequently, it is the practice of the art to introduce into the polyurethane foam reaction system a catalyst or accelerator to hasten the polymerization and cross-linking reaction. In general, the prior art has used tertiary amines as the catalyst, the more conventional ones being, for example, N-methylmorpholine and triethylamine.

The prior art catalysts as a class, however, present two disadvantages. In the first place, these catalysts are possessed with disagreeable and obnoxious odors which not only emanate during the manufacture of the foamed composition but also to an objectionable degree from the final product. When it is considered that big fields of application of polyurethane foams are cushions and mattresses, and foamed-in-place insulation for refrigerators and the like, it can readily be appreciated that this property of odor is one of practical significance. In the second place, such catalysts do not become an integral part of the polymer molecule after the foam has been prepared. It has been suggested that the presence of free amines has a deleterious effect on the heat aging properties of the polyurethane foam. It is therefore desirable to eliminate free amines from the final polyurethane foam product.

As mentioned previously herein, the high molecular weight, active hydrogen-containing compound is usually a hydroxy-terminated polyester, polyester amide, or a dihydric polyether. Actually, the trend of the art is in the direction of the dihydric polyethers in view of their more favorable economic position. Such polyethers are usually linear in nature with the result that it is usually necessary to provide, in addition to the polyisocyanate, a cross-linking agent such as trimethylol propane and the like, the proportion of cross-linking agent in the reaction mixture being dependent upon the degree of flexibility or rigidity desired in the final product.

It is a general object of this invention to provide the art with a polyhydric polyether containing within its molecule a tertiary amine, which is already in a branched condition such that to produce the polyurethane polymer, there need be, for the most part, chain extension and, to a lesser degree, combination of chain-extended polyethers.

It is a specific object of this invention to provide the art with a polyhydric polyether containing within its molecule a tertiary amine, which is itself relatively free of obnoxious odor, which contributes little or no odor to the polyurethane foam product and which functions as an accelerator for polymer growth.

These and other objects as may be developed as this specification proceeds are achieved by this invention.

In summary, our invention comprises a polyurethane foam composition obtained by reacting a tetra(polyoxypropylene)ethylene diamine with a polyisocyanate in stoichiometric excess and water. It encompasses polyurethane foam compositions within the range of complete flexibility to complete rigidity. This invention likewise comprises the process of preparing polyurethane foam compositions based on tetra(polyoxypropylene)ethylene diamine.

The polyethers involved in this invention may be generally described as the N,N,N',N'-tetrakis(polyoxypropylene) derivatives of ethylene diamine or simply the tetra-(polyoxypropylene) derivatives of ethylene diamine. Their general formula is as follows:

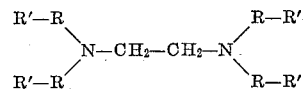

wherein R is

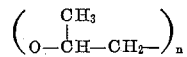

wherein R' is H and H—(O—$CH_2$—$CH_2$—)$_x$, wherein $x$ is such that the proportion of oxyethylene in the molecule is not greater than about 50% by weight, and wherein $n$ is an integer from about 1 to about 20.

These polyethers are prepared by condensing propylene oxide with ethylene diamine in the presence of a catalyst and the ethylene oxide-modified polyether is prepared by reacting the same with ethylene oxide in accordance with the teachings of U.S. Patent No. 2,674,619—Lundsted. As obtained, the polyethers of this invention may comprise a residual amount of caustic catalyst whereby the pH of a sample of the polyether may be quite high.

Broadly speaking, the polyethers of this invention may be characterized as polyfunctional nonlinear polyethers in contradistinction to mono- and difunctional linear polyethers such as polyoxyethylene glycol, polyoxypropylene glycol, and conjugated polyoxypropylene-polyoxyethylene glycols. Since the polyethers of this invention likewise contain two tertiary amino nitrogens, it is believed that this invention presents a unique situation in the art. The tetrafunctional tertiary amino nitrogen-containing polyether polyols used in the invention have a molecular weight between about 290 and 10,000.

It has been found that in using the polyethers of this invention in the prepolymer method of manufacture, the pH of the polyether should be less than 9, whereas for the premix or one-shot method, the pH may be as high as 10.5 The native pH of the polyfunctional, tertiary amino nitrogen-containing polyethers of this invention lies within a range from about 8 to about 11. To adjust the pH in accordance with the teachings herein, it has been found that either caustic soda or phosphoric acid can be used without adversely affecting the reaction between the polyether and the polyisocyanate.

The polyethers of this invention can be used in conjunction with any of the conventional polyisocyanates. So far the polyethers have been used in conjunction with commercial mixtures of diisocyanates such as toluene diisocyanate and the polyethers can be reacted with such diisocyanates as ethylenediisocyanate, ethylidine diisocyanate, propylene-1,2-diisocyanate, butylene-1,3-diisocyanate, hexylene-1,6-diisocyanate, cyclohexylene-1,2-diisocyanate, hexamethylene diisocyanate, m-phenylene diisocyanate, bis(toluene diisocyanate), bis(phenyl)methylene diisocyanate, bis(anisidyl diisocyanate), 2,4-toluene diisocyanate, 2,6-toluene diisocyanate, 3,3'-dimethyl-4,4'-biphenylene diisocyanate, 3,3'-dimethoxy-4,4'-biphenylene diisocyanate, 3,3'-diphenyl-4,4'-biphenylene diisocyanate, 4,4'-biphenylene diisocyanate, 3,3'-dichloro-4,4'-biphenylene diisocyanate, triphenylmethane triisocyanate, 1,5-naphthalene diisocyanate or polyisocyanates in a blocked or inactive form such as the bis-phenylcarbamates of toluene diisocyanate, p,p'-diphenylmethane diisocyanate, p-phenylene diisocyanate and 1,5-naphthalene diisocyanate, etc.

Suitable formulations and reaction methods incorporating the concepts of this invention are set forth by way of illustration in the following examples.

Example 1

This example illustrates the preparation of a flexible foam with good resiliency.

100 parts by weight of a tetrakis(polyoxyethylene-polyoxypropylene)-ethylene diamine which has a molecular weight of about 3500 and an oxyethylene concentration of about 10%, and 34.8 parts by weight of toluene diisocyanate are combined and reacted with stirring under anhydrous conditions for one hour at 70° C. The prepolymer is then cooled to room temperature.

0.4 part by weight of silicone oil (50 centistokes) is stirred into the prepolymer. A catalyst solution of 1.0 part by weight of N-methyl-morpholine and 3.0 parts by weight of water is then added. Stirring of the mixture is continued until a creamy appearance is discerned (about 15–30 seconds). The foam is permitted to rise undisturbed to full height and then cured at 160° F. for 30 minutes or overnight at room temperature. Average density of this type of foam is about 3.5 lbs./cu. ft.

Example 2

This example illustrates a rigid foam composition and a method for preparing the same.

100 parts of tetrakis(polyoxyethylene-polyoxypropylene)ethylene diamine which has a molecular weight of about 7200 and an oxyethylene concentration of about 40 to 50% by weight are mixed together with 0.6 part by weight of silicone oil (50 sentistokes), 2.0 parts by weight of water and 24 parts by weight of a cross-linking agent described as N,N,N',N'-tetrakis(2-hydroxypropyl)ethylene diamine. The mixture is stirred until well blended and then 80 parts by weight of toluene diisocyanate are added and the mixture stirred until creamy.

Example 3

This example illustrates the preparation of a flexible polyurethane foam having good load bearing properties and low compression set.

A prepolymer is prepared by reacting 100 parts by weight of a tetra(polyoxyethylene-polyoxypropylene)ethylene diamine having a molecular weight of 3500 and an oxyethylene concentration of 10–19% by weight with 39.2 parts by weight of an 80/20 mixture of 2,4/2,6 toluene diisocyanate in accordance with the following procedure. The polyether (0.028 mol) and 12.2 parts of toluene diisocyanate (0.070 mol) are charged to a reactor vessel equipped with an agitator, temperature measuring device, reflux condenser and an inlet for dry inert gas. Heating and agitation are started under a dry inert gas blanket of 0.002 to 0.003 cubic foot per hour per pound of the polyether. The temperature is raised rapidly to 70° C. and maintained until a viscosity of 8,000 cps. at 25° C. is reached (approximately 1½ hours after reaching 70° C.). The remaining toluene diisocyanate (27 parts, 0.155 mol) is then added and cooking is continued at 70° C. for ½ hour. The prepolymer is then rapidly cooled to below 50° C. The resulting prepolymer has a viscosity of about 6500 cps. at 25° C. and a free NCO content of 8.9 to 9.1%.

To 100 parts of the prepolymer are mixed in 0.4 part by weight of silicone oil (50 centistokes). A mixture of 1.0 part by weight of N-methyl-morpholine, 0.2 part by weight of triethylamine and 2.3 parts by weight of water is then mixed into the prepolymer-silicone oil combination whereupon the mixture commences to polymerize and foam.

Immediately after foaming is completed, the foam is placed in an oven at 70° C. for about 15 minutes. The foam is then removed from the oven and crushed two times to 10% of the original thickness. To complete the curing, the foam is returned to the oven and held overnight (more than 16 hours) at 70° C.

A sample of foam prepared as indicated in the foregoing except that following the crushing step the foam was cured for 16 hours at 70° C. dry heat, and a sample of foam prepared in accordance with the foregoing except that following the crushing step the foam was cured for 7 days at 70° C., at 95% relative humidity, gave the following physical property data.

|  | 16 Hour Cure at 70° C. Dry Heat | 7 Day Cure at 70° C. 95% R.H. |
| --- | --- | --- |
| Density (lbs./cu.ft.) | 2.53 | (¹) |
| Tensile strength (p.s.i.) | 11.0 | (¹) |
| 100% modulus (p.s.i.) | 7.6 | (¹) |
| Elongation (percent) | 148 | (¹) |
| Tear resistance (p.i.) | 1.8 | (¹) |
| Compression set (percent—ASTM, Method B) | 15 | 7.4 |
| Compression deflection: |  |  |
| 25% deflection (p.s.i.) | 0.32 | 0.37 |
| 50% deflection (p.s.i.) | 0.44 | 0.44 |
| 75% deflection (p.s.i.) | 1.17 | 1.09 |

¹ Not reported.

Example 4

This example illustrates the preparation of semirigid polyurethane foams that are characterized by rapid rising and tack-freeness almost immediately upon completion of the foaming action. The formulations for these foams are set forth as follows.

|  | Formulation I, parts by wt. | Formulation II, parts by wt. | Formulation III, parts by wt. |
|---|---|---|---|
| Polyether (N,N,N',N' tetrakis (polyoxyethylene-polyoxypropylene) ethylene diamine having a molecular weight of 7200 and an oxyethylene concentration of 40–49%) | 100 | 100 | 100 |
| Silicone oil (50 centistokes) | 0.6 | 0.6 | 0.6 |
| Water | 2.0 | 2.5 | 3.0 |
| N,N,N',N' tetrakis (2-hydroxypropyl) ethylene diamine | 30.0 | 30.0 | 30.0 |
| Toluene diisocyanate (80/20, 2,4/2,6 isomer mixture) | 65.0 | 68.0 | 75.0 |

The polyether, silicone oil, water and N,N,N',N'-tetrakis(2-hydroxypropyl)ethylene diamine are mixed together and stirred until well blended. The toluene diisocyanate is then added and the mixture stirred until creamy. At this point the mixture in each case begins to foam, as indicated by the reaction mass turning white, and the reaction mass is poured quickly into a mold. The foam will reach its full height in about one minute and in each case the foam will be tack-free in about another minute. Such rapidity of cure permits the use of these formulations in spray operations.

Measurements of physical properties of foams of each formulation were obtained and are set forth as follows:

|  | Formula I | Formula II | Formula III |
|---|---|---|---|
| Density, lbs./cu. ft | 3.5 | 2.5 | 2.0 |
| Tensile strength, p.s.i | 23.8 | 21.5 | 14.0 |
| Compression-Deflection: |  |  |  |
| 25% deflection, p.s.i | 9.3 | 7.3 | 5.6 |
| 50% deflection, p.s.i | 11.5 | 8.5 | 6.6 |
| 75% deflection, p.s.i | 33.5 | 20.0 | 15.0 |

*Example 5*

This example illustrates a flexible polyurethane foam and a procedure for making same which involves linear polyethers in combination with the polyoxypropylene derivatives of ethylene diamine. These foams are useful for comfort seating. These foams are prepared by the prepolymer method and the prepolymer formulations are as follows.

|  | Formulation I, parts by wt. | Formulation II, parts by wt. |
|---|---|---|
| Linear polyether (conjugated polyoxypropylene-polyoxyethylene polymer which has a molecular weight of about 2,000 and a polyoxyethylene proportion of about 10% by weight in the total molecule) | 75 | 66.7 |
| Polyether (N,N,N',N' tetrakis (polyoxyethylene-polyoxypropylene)ethylene diamine which has a molecular weight of about 3500 and a polyoxyethylene content of about 10–19% by weight of the total molecule) | 25 | 33.3 |
| Toluene diisocyanate (80/20, 2,4/2,6 isomer mixture) | 38.25 | 36.6 |

With respect to Formulation No. I the linear polyether (0.0375 mol) and the polyfunctional polyether (0.0072 mol) along with 9.70 parts (0.0558 mol) of toluene diisocyanate are charged to a reaction vessel equipped with an agitator, temperature measuring device, reflux condenser and an inlet for a dry inert gas. Heating and agitation are started under an inert gas blanket of 0.002–0.003 cubic foot per hour per pound of the combined polyethers (approximately 1.5 cc./min./lb. of the combined polyethers). The temperature is then raised rapidly to 110° C. (reaction time is counted from time temperature has reached 90° C.). Periodic viscosity samples are taken until a viscosity of 9500 to 10,000 cps. at 25° C. is reached. Toluene diisocyanate is then added to the reactor, maintaining the temperature at 110° C., at a rate of 0.25 pound of toluene diisocyanate per hour per pound of combined polyethers until a total of 21.33 parts by weight (0.1225 mol) have been added. The prepolymer is then cooled to 80° C. with agitation and then a final amount of 7.22 parts by weight (0.0415 mol) of toluene diisocyanate is added all at once. Agitation of the reactor contents is continued for at least 15 minutes and then the prepolymer is cooled rapidly to below 50° C.

With respect to Formulation No. II, the polyethers and 10.4 parts by weight of toluene diisocyanate are charged to a reactor vessel equipped with an agitator, temperature measuring device, reflux condenser and an inlet for a dry inert gas. Heating and agitation are commenced under an inert gas blanket of 0.002 to 0.003 cubic foot per hour per pound of combined polyethers. Temperature is raised rapidly to 100° C., computing the reaction time from the moment temperature has reached 80° C. Periodic viscosity samples should be taken until a viscosity of 9500 to 10,000 cps. measured at 25° C. is reached. Toluene diisocyanate is then added to the reactor, maintaining the temperature at 100° C., at a rate of 0.25 pound of toluene diisocyanate per hour per pound of the combined polyethers until an additional total of 21.0 parts by weight has been added. After the toluene diisocyanate addition is completed, the reaction mass is then cooled to 80° C. with agitation and a final amount of 5.2 parts by weight of toluene diisocyanate is then added all at once. Agitation is continued for at least 15 minutes and the prepolymer is then cooled to a temperature below 50° C.

Each of the prepolymers so prepared will have a viscosity of 6,000±1,000 cps. at 25° C. and a free NCO concentration, in case of prepolymer Formulation No. I, of 9.5±0.2% by weight and, in the case of prepolymer Formulation No. II, 9.0±0.3% by weight. The prepolymer in each case is then reacted by first adding to 100 parts by weight of the prepolymer 0.4 part by weight of silicone oil (having a viscosity of 50 centistokes) and to this mixture a mixture of 1.0 part by weight of N-methylmorpholine, 0.2 part by weight triethylamine and 2.3 parts by weight of water. The resultant foam is placed into a circulating air oven at 70° C. and after 15 minutes removed from the oven and crushed two times to 10% of the original foam thickness. The crushed foam is then returned to the oven and cured further at 70° C. for at least 16 hours.

On free foamed samples the following physical properties were ascertained.

|  | Formulation I | Formulation II |
|---|---|---|
| Density, lbs./cu. ft | 2.0–2.5 | 2.40 |
| Tensile strength, p.s.i | 10–14 | 12.2 |
| 100% Modulus, p.s.i | 4–6 | 5.6 |
| Elongation, percent | 200–250 | 207 |
| Tear resistance, p.i | 2–3 | 1.9 |
| Compression set, percent (ASTM Method B) | 15–25 | 12.3 |
| Compression-Deflection: |  |  |
| 25% deflection, p.s.i | 0.35–0.38 | 0.45 |
| 50% deflection, p.s.i | 0.50–0.60 | 0.65 |
| 75% deflection, p.s.i | 1.80–1.90 | 1.89 |

Polyurethane foams prepared in accordance with this invention appear to have unique properties.

With regard to flexible foams the cell structure appears small and uniform and appears to be closer to foam rubber than other polyurethane foams prepared from polyesters and other polyethers. Moreover, the foam compositions of this invention appear to have increased resilience.

With respect to rigid foams, it has been found that the combination of the polyfunctional polyethers with N,N,N',N' tetrakis(2-hydroxypropyl)ethylene diamine, toluene diisocyanate and water forms rigid foams by way of the "one-shot" or immediate mix method which require no additional amine catalyst and which are odorless. Such foams are less friable than foams prepared with N,N,N',N' tetrakis(2-hydroxypropyl)ethylene diamine. This is shown in the following table.

|  | Formulation I | Formulation II | Formulation III |
|---|---|---|---|
| Polyfunctional polyether (N,N,N',N' tetrakis ((polyoxyethylene-polyoxypropylene) ethylene diamine having a molecular weight of 7200 and a polyoxyethylene content of 40-49% by weight). | 100 | 50 |  |
| N,N,N',N' tetrakis(2-hydroxypropyl)ethylene diamine. | 35 | 37 | 39. |
| Silicone oil (50 centistokes) | 0.60 | 0.46 | .32. |
| Water | 1.50 | 1.50 | 1.50. |
| Toluene diisocyanate | 75 | 75 | 75. |
| Description of foam | Fast gelling, warm, not scorched. Foam semirigid. | Fast gelling, warm, not scorched. Foam rigid. | Very fast gelling, hot, scorched. Foam very rigid and friable. |
| Foam density | About 2 lbs./cu. ft. | About 1½ lbs./cu. ft. | About 1 lb./cu. ft. |

Process-wise the flexible foam formulations based on the concepts of this invention have greatly improved molding properties. The polyfunctional polyethers, particularly when used in combination with linear polyethers, provide low viscosity prepolymers (3,000–6,000 centipoises) which flow well into intricate molds and yet gel rapidly to give a resulting cell structure of a fine and uniform nature. The rapid development of gel strength prevents foam collapse of the freshly made foam as it is being forced into all interstices of the mold. By comparison, molded foams made from linear polyethers such as a conjugated polyoxypropylene-polyoxyethylene glycol having a molecular weight of about 2,000 and a polyoxyethylene concentration of about 10–20% as the sole polyol and molded foams from polypropylene glycol having a molecular weight of 2,000 show coarse and irregular cell structure and sometimes even foam collapse. Moreover, such foams do not provide a molded article with desirable physical properties.

Other methods (such as the use of triethylamine or other rapid gelling catalysts) have been tried to obtain more rapid gellation of the linear polyether-diisocyanate foams. However, the resultant foams were not of high quality and the aging properties, especially at high temperature and humidity, are comparatively poor as evidenced by the increased compression set of the foams.

Still another feature of advantage of the concepts of this invention is that the prepolymers prepared from the polyfunctional polyethers have viscosity stability.

Still another feature of advantage of this invention is that the polyfunctional polyethers are compatible with the polyisocyanates, particularly toluene diisocyanate, even at room temperatures. No emulsifiers are needed and accordingly prepolymer reactions can be carried out at any reaction temperature between 70° F. to 220° F.

Still another feature of this invention is that for the first time rigid and semirigid foams can be prepared from polyethers and by the one-shot technique.

In the various examples and formulations set forth herein, it will be observed that a silicone oil has been included. Such, however, is not essential to the polyurethane foams of this invention. The silicone oil appears to function as a cell size controlling agent and merely amounts to a well known refinement within the environment of this invention.

An advantage of this invention is that the branched structure of the polyhydric polyethers of this invention makes the hydroxyl groups more accessible to cross-linking by polyisocyanates.

What is claimed is:
1. A semirigid polyurethane foam composition obtained by reacting (1) 50–100 parts by weight of a polyol consisting of N,N,N',N' tetrakis(hydroxypolyethylene-polyoxypropylene)ethylene diamine, which has a molecular weight of about 7200 and a proportion of polyoxyethylene in the polyol molecule of from 40 to 50 weight percent; (2) 20–40 parts by weight of N,N,N',N' tetrakis-(2-hydroxypropyl)ethylene diamine; (3) 65–80 parts by weight of toluene diisocyanate and (4) 1.5–3 parts by weight of water, said polyols being at a pH below about 11.

2. A polyurethane foam composition obtained by simultaneously mixing and reacting a plurality of reactants consisting of the following: (A) a polyol having a molecular weight between about 290 and 10,000 which is a ditertiary lower-alkylene diamine having both of its two tertiary nitrogen atoms further substituted as indicated by the formula:

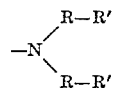

wherein N is one of the two tertiary nitrogen atoms of the diamine molecule, wherein R is

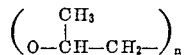

wherein R' is selected from the group consisting of H and H—(O—CH$_2$—CH$_2$—)$x$, wherein $x$ is such that the proportion of oxyethylene in the polyol molecule is not greater than about 50% by weight, and wherein $n$ is an integer from about 1 to about 20, said polyol being at a pH less than about 11, with (B) an organic polyisocyanate, in a molar ratio of (B) to (A) in excess of 4 to 1, and (C) a small proportion of water, the water being present in a molar ratio to said excess of (B) of from about 0.3:1 to about 1:1.

3. A polyurethane foam composition obtained by reacting (A) a polyol having a molecular weight between about 3,500 and 10,000 which is a ditertiary lower-alkylene diamine having both of its two tertiary nitrogen atoms further substituted as indicated by the formula:

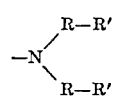

wherein N is one of the two tertiary nitrogen atoms of the diamine molecule, wherein R is

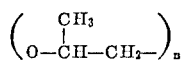

wherein R' is selected from the group consisting of H and H—(O—CH$_2$—CH$_2$—)$_x$, wherein $x$ is such that the proportion of oxyethylene in the polyol molecule is from about 10 to about 50% by weight, and wherein $n$ is an integer from about 1 to about 20, and a second polyol (A') which is N,N,N',N'-tetrakis(2-hydroxypropyl)ethylene diamine, said polyols being at a pH below about 11, with (B) an organic polyisocyanate, in a molar ratio of (B) to the combined (A) and (A') in excess of 4 to 1, and (C) a small proportion of water, the water being present in a molar ratio to said excess of (B) of from about 0.3:1 to about 1:1.

4. A polyurethane foam composition obtained by reacting N,N,N',N'-tetrakis(2-hydroxypropyl)ethylene diamine, an organic polyisocyanate in excess of one mole per hydroxy radical of said N,N,N',N'-tetrakis(2-hydroxypropyl)ethylene diamine, and water in a molar ratio to said excess of polyisocyanate from about 0.3:1 to about 1:1, the said N,N,N',N'-tetrakis(2-hydroxypropyl)-ethylene diamine being at a pH below about 11.

5. A polyurethane foam composition obtained by reacting a first polyol of the formula

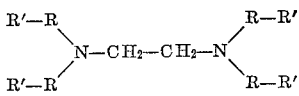

wherein R is

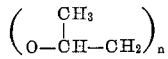

R' is selected from the group consisting of H and H—(O—CH$_2$—CH$_2$)$_x$, $n$ is an integer in the range from 1 to 20 and $x$ is such that the total oxyethylene content of the molecule is in a range from over 0 to about 50 weight percent of the molecule, and a second polyol which is N,N,N',N'-tetrakis(hydroxypropyl)ethylene diamine, an organic polyisocyanate in excess of four moles per each mole of both polyols considered together; and water in a molar ratio to said excess of polyisocyanate from about 0.3:1 to about 1:1, the polyols being at a pH below about 11.

6. A composition according to claim 5, wherein said first polyol is N,N,N',N'-tetrakis(hydroxy-polyoxyethylene-polyoxypropylene)ethylene diamine which has a proportion of polyoxyethylene in the polyol molecule of about 10 to about 20 weight percent.

7. A composition according to claim 5, wherein said first polyol is N,N,N',N'-tetrakis(hydroxy-polyoxyethylene-polyoxypropylene)ethylene diamine which has a proportion of polyoxyethylene in the polyol molecule of about 40 to 50 weight percent.

8. A process for producing a polyurethane foam composition comprising simultaneously mixing and reacting a plurality of reactants consisting of the following: a polyol conforming to the formula:

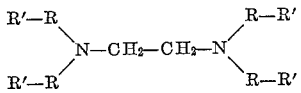

wherein R is

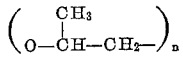

R' is selected from the group consisting of H and H—(O—CH$_2$—CH$_2$—)$_x$, $n$ is an integer in the range from 1 to 20 and $x$ is such that the total oxyethylene content of the polyol molecule is not greater than about 50 weight percent, with the pH of the said polyol being less than about 11, an organic polyisocyanate in a molar ratio to said polyol in excess of 4:1, and a small proportion of water, the water being present in a molar ratio to said excess of isocyanate of from about 0.3:1 to about 1:1.

9. A process for producing a polyurethane foam composition comprising simultaneously mixing and reacting two different polyols, both conforming to the formula:

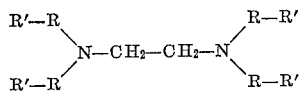

wherein R is

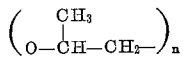

R' is selected from the group consisting of H and H—(O—CH$_2$—CH$_2$—)$_x$, $n$ is an integer in the range from 1 to 20 and $x$ is such that the total oxyethylene content of the polyol molecule is not greater than about 50 weight percent, one of said polyols being N,N,N',N'-tetrakis(hydroxypropyl)ethylene diamine, the pH of the said polyols being less than about 11, an organic polyisocyanate in a molar ratio to said combined polyols in excess of 4:1, and a small proportion of water, the water being present in a molar ratio to said excess of isocyanate of about 0.3:1 to about 1:1.

10. A polyurethane foam composition obtained by simultaneously mixing and reacting a plurality of reactants consisting of the following:
(A) a polyol selected from the group consisting of:
(1) a polyol having a molecular weight greater than 292 which is a ditertiary lower-alkylene diamine having both of its two tertiary nitrogen atoms further substituted as indicated by the formula:

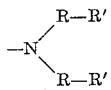

wherein N is one of the two tertiary nitrogen atoms of the diamine molecule, wherein R is

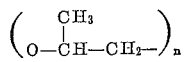

wherein R' is selected from the group consisting of H and H—(O—CH$_2$—CH$_2$—)$_x$, wherein $n$ is an integer in the range from 1 to about 20 and $x$ is an integer such that the total oxyethylene content of the polyol molecule is not greater than about 50% by weight,
(2) N,N,N',N' - tetrakis(hydroxypropyl)ethylene diamine, and
(3) mixtures of (1) and (2), and
(B) an organic polyisocyanate, in a molar ratio of (B) to (A) in excess of 4 to 1, and
(C) a small proportion of water, the water being present in a molar ratio to said excess of (B) of about 0.3:1 to about 1:1.

References Cited in the file of this patent
UNITED STATES PATENTS

| | | |
|---|---|---|
| 2,674,619 | Lundsted | Apr. 6, 1954 |
| 3,042,631 | Strandskov | July 3, 1962 |

OTHER REFERENCES

Heiss et al.: "Industrial and Eng. Chem., volume 46, No. 7, July 1954, pages 1498 to 1503.

"Chem. and Eng. News," volume 35, No. 3, January 21, 1957, page 78.

"Quadrol," Technical Data Sheet, Wyandotte Chemicals Corp., Mkt. Development, Research and Eng. Div., F3305-D, December 18, 1956, pages 1 to 5.